Figures 1, 2:
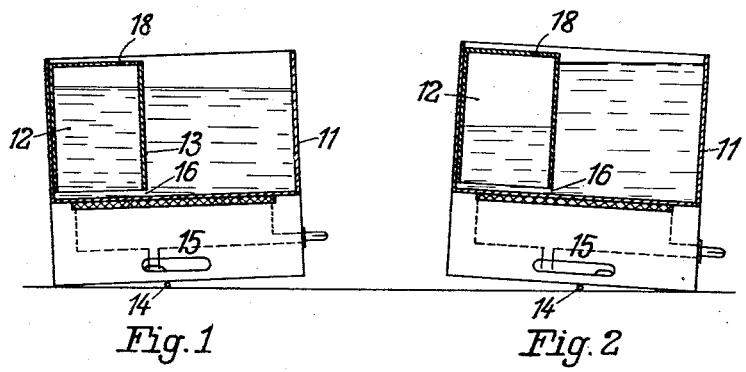

April 18, 1933.  E. R. DEL RICCIO  1,904,205

ELECTRIC HEATING AND COOKING APPLIANCE

Filed April 8, 1931

Inventor:

Patented Apr. 18, 1933

1,904,205

UNITED STATES PATENT OFFICE

EDUARDO RICCI DEL RICCIO, OF BERLIN, GERMANY

ELECTRIC HEATING AND COOKING APPLIANCE

Application filed April 8, 1931, Serial No. 528,615, and in Germany April 17, 1930.

My invention relates to electric heating and cooking appliances.

The object of my invention is to provide a device for automatically interrupting the heating circuit to such appliances when the liquid contained in the vessel boils.

It has already been proposed to solve this problem by utilizing the pressure of the steam developed to operate the lever of an electric switch, or by condensing the steam in a special cooling device and to utilize the weight of the water of condensation for operating an electric switch.

Both these devices are complicated and expensive, the latter to such an extent that its application to domestic cooking appliances appears hardly practicable.

My invention solves the problem in an extremely simple manner and without the use of any movable parts. According to my invention the pressure of the steam raised when the liquid boils acts upon the liquid in the vessel and displaces it asymmetrically, whereby the vessel is tipped and an electric switch operated to break the heating circuit.

In reducing my invention to practice I make use of a vessel provided with a tipping axis located close to the center of gravity and around which the vessel may tip into one or the other end position, in one of which the heating circuit is closed and in the other broken, for instance by means of a mercury tipping switch.

My invention consists substantially in providing within the vessel at one side of the tipping axis an inverted auxiliary receptacle. When the liquid in the vessel boils the liquid contained in the auxiliary receptacle will be forced out by the steam pressure and the center of gravity of the appliance displaced from the side of the auxiliary receptacle, in which the circuit closed, to the other side of the tipping axis, whereby the cooking vessel is tipped and the heating circuit is automatically broken.

The tipping axis may be formed by a projecting edge embossed in the bottom of the vessel, by feet provided upon the bottom of the vessel or mounted a little higher up upon the side walls of the vessel.

The auxiliary receptacle may consist of a compartment or section of the vessel closed at the top and at the bottom provided with an opening or slit adapted to put it in communication with the vessel. The top is provided with a perforation, valve, cock or the like through which the air may escape when the vessel is filled with water, so that the water stands at the same level within and without the auxiliary receptacle. The auxiliary receptacle may, however, consist of a separate part adapted to be placed into the boiling or cooking vessel, pot or pan. The advantage of a separate, simple and removable auxiliary receptacle is that it may be taken out of the vessel and cleaned if it is desired to use the vessel for cooking food in, which is of course impossible in case of a partition wall soldered in the pot or pan.

Figure 3:
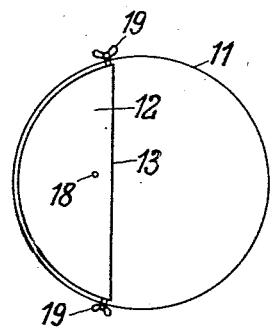

An embodiment of my invention is illustrated by way of example in the drawing affixed to my specification and forming part thereof. In the drawing is:

Fig. 1, a vertical section through the appliance with the heating circuit closed, Fig. 2, a similar view, but with the heating circuit open, and Fig. 3, a plan of my improved appliance.

Like parts are indicated by like letters of reference throughout all the figures of the drawing.

Referring to the drawing it will be observed that within the vessel, pot or pan 11 there is secured an auxiliary receptacle 13 by means of winged screws 19 or in any other suitable manner. This auxiliary receptacle has preferably the form shown in Fig. 3. It is a reversed receptacle closed at the top and open at the bottom, as clearly shown in Figs. 1 and 2. Its wall does not extend right down to the bottom of the pot or pan so that the auxiliary receptacle and the pot are in communication through the slot or gap 16 and the water poured into the pot rises to the same level in the auxiliary receptacle 13. To allow the air contained in the auxiliary receptacle to escape when the water is poured into the pot a small hole, valve, cock or the like 18 is provided in the top of the receptacle. In this way the liquid rises to the same lever as in the pan, as shown in Fig. 1. In this position the mercury tipping switch 15 is provided in the bottom portion of the pot closes the circuit to to the heating resistance provided at the underside of the inner bottom of the vessel 11. The center of gravity of the pot is now located at the left of the tipping axis 14. When the liquid boils the steam inclosed in the upper part of the auxiliary receptacle 13, unable to escape in sufficient quantity through the opening 18 or prevented from escaping at all by a valve, forces the liquid through the gap 16 into the pot. The level of the liquid will then be as shown in Fig. 2 and the center of gravity of the appliance be displaced to the right-hand side of the tipping axis 14 so that the pot is tipped towards this side and the tipping switch opens the circuit.

In this form the appliance is particularly suitable for domestic purposes.

By correspondingly proportioning the auxiliary receptacle 13 or arranging the edge or feet 14, or controlling the opening 18, the vessel may be caused to return into the position shown in Fig. 1, circuit closed, after the liquid in the vessel has cooled down again. In this form the appliance is suitable for calorifiers or hot water storage vessels, and in particular for cafeterias or tea rooms where hot water should be available at any time. By providing the appliance with an adjustable tipping axis it may be made to function in both the manners described above.

It will be readily understood that various changes and modifications may be made without departing from the spirit of my invention and the ambit of the appended claims, and that the appliance may be applied to various domestic and industrial appliances, such as washing machines, calorifiers, coffee percolators, chemical boilers and many others.

I claim as my invention:

1. A cooking appliance comprising in combination an electrically heated vessel, a tipping pivot element upon said vessel, an auxiliary vessel closed at the top and open at the bottom located within said main vessel laterally to said tipping pivot element, and means adapted to be actuated by the tipping of the vessel for breaking the heating circuit.

2. A cooking appliance comprising in combination an electrically heated vessel, a tipping pivot element upon said vessel, an auxiliary vessel closed at the top and open at the bottom located within said main vessel laterally to said tipping pivot element, and means adapted to be actuated by the tipping of the vessel for breaking the heating circuit definitely or alternately breaking and reclosing it when the temperature of the liquid drops.

3. A cooking appliance comprising in combination an electrically heated vessel, a tipping pivot element upon said vessel, an auxiliary vessel attached to the lid of said vessel and open at the bottom adapted to be placed laterally to said tipping pivot element, and means adapted to be operated by the tipping of the vessel for breaking the heating circuit.

4. A cooking appliance comprising in combination an electrically heated vessel, a tipping ridge provided at the bottom of the vessel laterally of the vertical axis through the center of gravity of the vessel, an auxiliary inverted vessel suspended within said main vessel stopping short of the bottom of said main vessel and provided with a closable opening at the top, the steam raised when the liquid is boiling in the vessel displacing the liquid from the auxiliary vessel into the main vessel and shifting the center of gravity to the other side of said tipping ridge, and a switch adapted to break the heating circuit when the vessel has tipped.

In testimony whereof I have signed my name to this specification.

EDUARDO RICCI DEL RICCIO.